April 14, 1936.  E. MARTYRER ET AL  2,037,252
HYDRODYNAMIC POWER TRANSMISSION DEVICE
Filed July 6, 1934  3 Sheets-Sheet 2
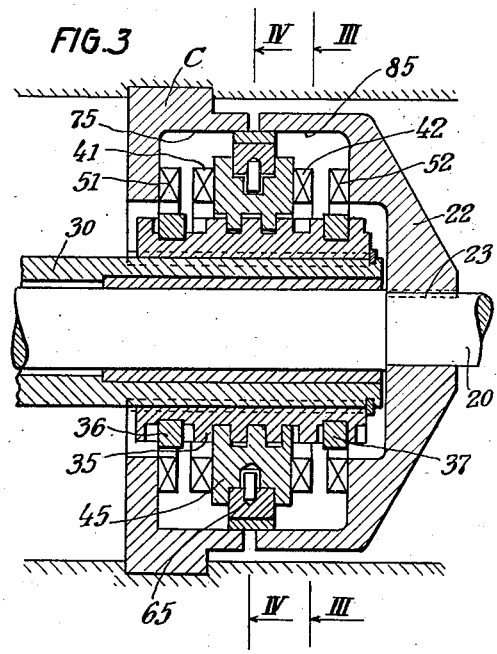
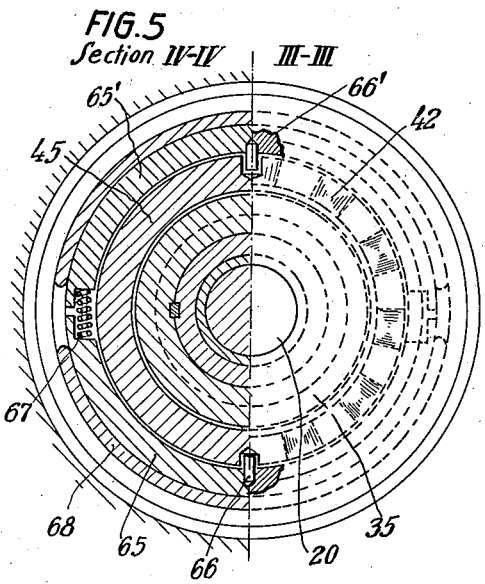
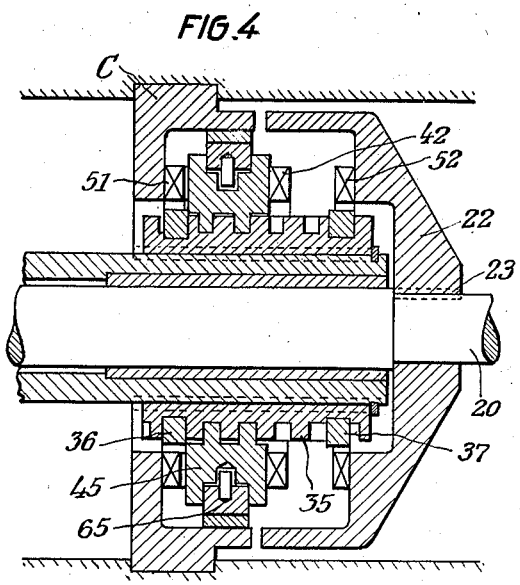
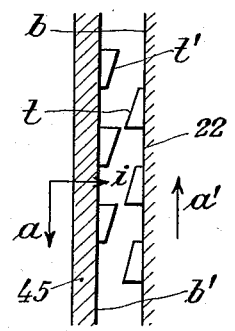
Inventors: Egon Martyrer,
Rudolf Haeckel
by Karl Viertel
Attorney

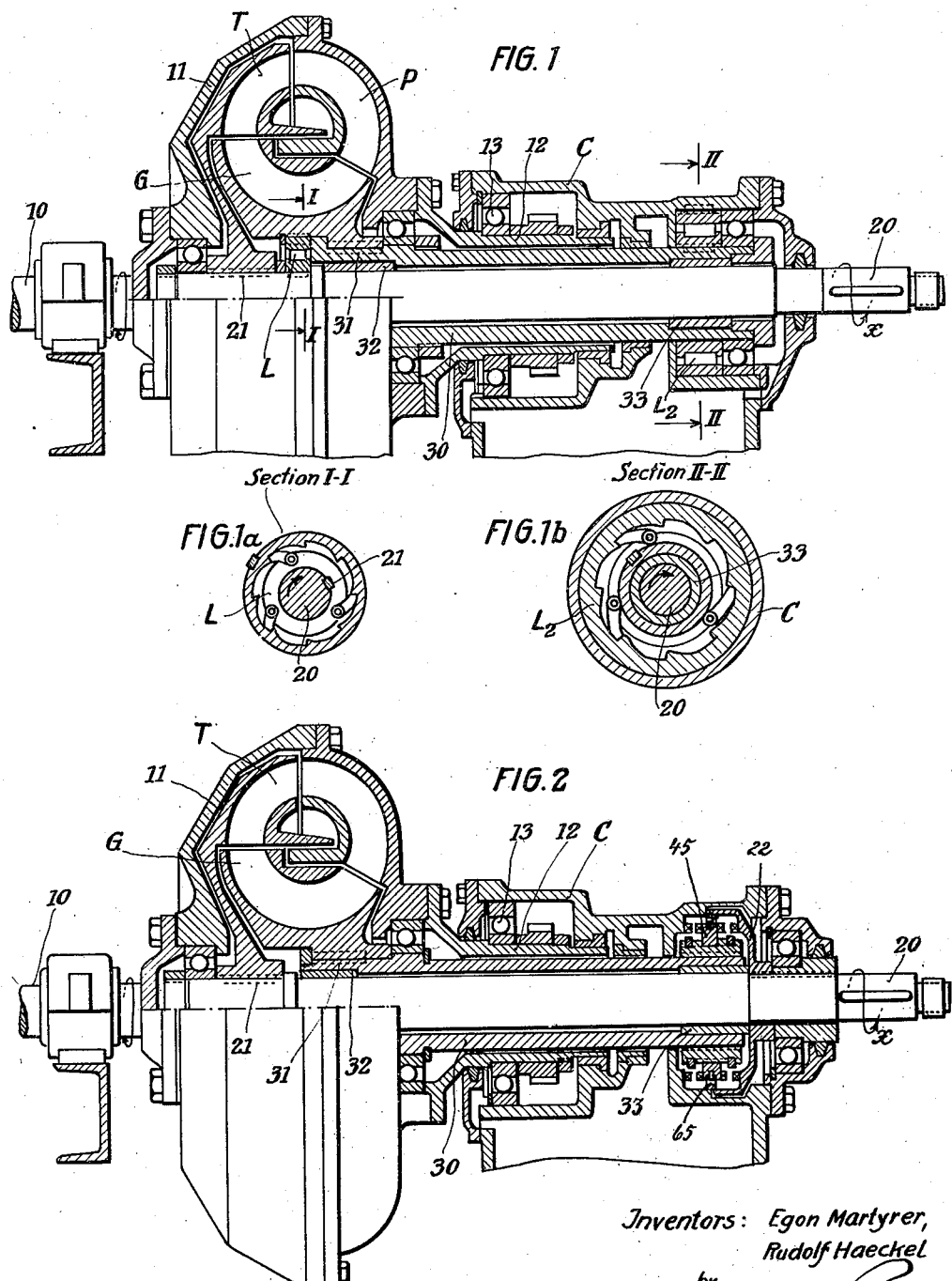

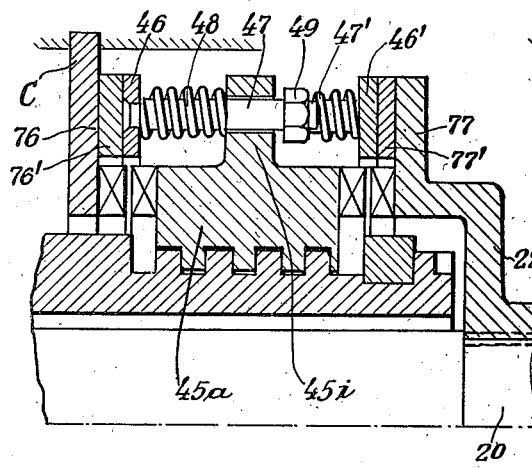
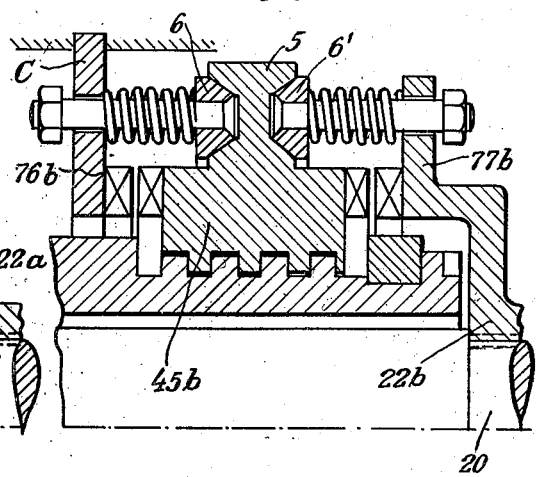
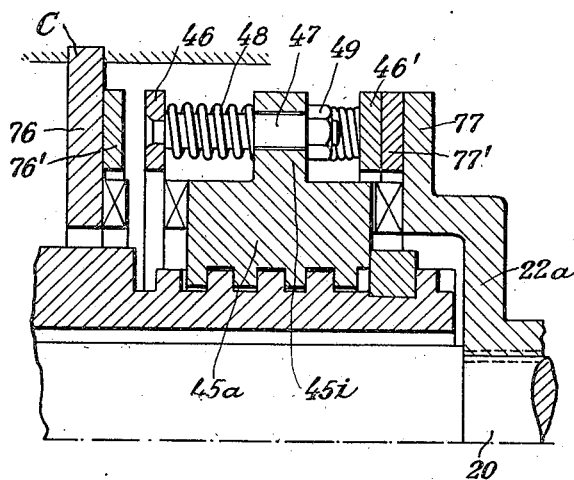

Patented Apr. 14, 1936

2,037,252

UNITED STATES PATENT OFFICE 2,037,252

HYDRODYNAMIC POWER TRANSMISSION DEVICE

Egon Martyrer, Frankenthal, and Rudolf Haeckel, Worms, Germany

Application July 6, 1934, Serial No. 733,990
In Germany July 14, 1933

7 Claims. (Cl. 60—54)

Our invention relates to hydrodynamic devices for transmitting mechanical power through a liquid medium from one rotary shaft to another rotary shaft, and working on the "Föttinger" flow-and-reaction principle, according to which by the impeller wheel of a centrifugal pump, keyed to the primary or driving shaft, the liquid medium is thrown against and forced through the bladed wheel or wheels of a turbine, by which the secondary shaft is driven.

The invention relates more especially to structural improvements in hydrodynamic power transmission devices of the recently developed automatic type, which essentially consist of a stationary casing and three or more bladed wheels, through which the working liquid circulates in one closed circuit, and which are so designed and cooperatively associated with each other, that one of the said bladed wheels, hereinafter called "guide wheel", is capable of spontaneously locking itself—in response to variations of the load or to other changes in the working conditions imposed on the gear—either with the stationary member or the turbine wheel (or wheels), in order to perform different functions—viz. to work as a torque converter or as a mere coupling respectively.

A hydrodynamic power transmission device, adapted to automatically change its function as indicated, has been invented by two German inventors, Kluge and Böllinger, with whom we are cooperating, and is disclosed in their United States Patent 1,970,236, to which this application is an improvement.

The object of our invention will be better understood by reviewing the design and cooperation of the principal structural elements, of which hydrodynamic power transmission devices of said automatic type are composed, and which are shown in Figs. 1, 1a, 1b of the accompanying drawings.

The said automatic power transmission device essentially consists of:

1. A bladed pump wheel P, flanged by means of a shell 11 to the primary shaft 10,
2. A stationary casing C, in which pump wheel P is journalled by means of a tubular trunnion 12 and an anti-friction bearing 13,
3. A bladed turbine wheel T, keyed at 21 to the secondary shaft 20;
4. An auxiliary bladed wheel G, hereinafter called guide wheel, which is keyed at 31 to a hollow shaft 30; the latter is spaced by means of bushes 32, 33 from the secondary shaft 20 so as to be freely rotatable around the latter; and
5. Self-locking devices L, L2, best seen in Figs. 1a and 1b, which are designed on the order of roller and incline slot or multiple pawl ratchet gears acting in one direction, and which are so cooperatively associated with the guide wheel G, the hollow shaft 30, the stationary casing C and the secondary shaft 20, that guide wheel G, because of specific structural features characteristic of said hydrodynamic power transmission devices will—in response to changes, brought about in the working conditions of the gear, for instance by a change of the load on the secondary shaft,—automatically interlock itself either with the secondary shaft 20, which may rotate say in the direction indicated in Fig. 1 by arrow $x$, so as to assist in the work of the turbine T, or alternatively with the stationary casing C, so as to be arrested by the latter and to perform its duty as torque converting element.

As a matter of fact some serious drawbacks are inherent to self-locking devices of the design and arrangement, shown in Figs. 1, 1a, 1b.

The reader on analyzing the specific interengaging function of said self-locking devices L, L2 will realize, that the secondary shaft 20 should it be revolved by any accidental cause in the reverse direction will become interlocked with the stationary casing C via the hollow shaft 30, so as to be positively blocked by the former.

In practice it frequently occurs, that the secondary shaft of a power transmission device receives backwardly directed rotary shocks, for instance in the case of a Diesel locomotive, used for shunting about railroad cars or trains of cars: Whenever the resilient buffers of the locomotive touch the front buffers of a train of cars standing at rest, with which the locomotive is to be coupled, the springs of the buffers, which come into mutual contact, are compressed with the result that the Diesel locomotive is more or less violently thrown backwards—as far as the coupling will allow—and that in turn the propeller shaft, i. e. the secondary shaft of the power transmission gear of the Diesel locomotive receives a rotary shock, by which said shaft is revolved in backward direction.

Since the secondary shaft 20 of the hydrodynamic power transmission device shown in Figs. 1, 1a, 1b would be positively blocked by the stationary casing on receiving a backwardly directed rotary shock, as explained with regard to a Diesel locomotive, serious damage would be inflicted upon the device.

Other drawbacks inherent to hydrodynamic power transmission gears of the type described lie in the facts, that one of its self-locking devices—L—shown in Fig. 1a, is confined in a place, where it is practically inaccessible for inspection and repair; and that the self-locking device L is subjected to excessive wear because of its limited diameter, the consequent smallness of the working faces, which are in contact with each other, and the resulting high specific pressure upon said faces.

The primary object of this invention is to provide a hydrodynamic power transmission gear of the automatic type and of improved design, which is safe against becoming damaged through backwardly directed shocks accidentally imparted to the secondary shaft.

In connection therewith the invention aims at so re-designing and re-arranging the self-locking devices concerned, that they are both readily accessible for inspection and repair and will be safe against becoming prematurely worn out or untimely refusing to work.

Other objects of the invention—including safe transmission of relatively large torques—will become incidentally apparent hereinafter to practitioners in this field.

The nature and scope of this invention are briefly outlined in the appended claims and will be more fully understood from the following specification taken together with the accompanying drawings, in which Figs. 1, 1a and 1b are sectional views described above, Fig. 2 is a section longitudinally taken through a hydrodynamic power transmission gear having a self-locking device designed according to this invention and being shown by way of an example, Figs. 3 and 4 are fragmentary longitudinal sections drawn on a larger scale and showing the structurally improved self-locking device alone in two characteristic working positions, Fig. 5 represents cross sections taken through the self-locking device on lines III—III, IV—IV in Fig. 3, Fig. 6 shows diagrammatically two sets of teeth of special design, with which the self-locking device is preferably provided, Figs. 7 and 8 are longitudinal sections through a structurally modified self-locking device designed according to this invention and being shown in two characteristic positions, Fig. 9 shows another self locking device having a structurally modified braking mechanism.

In the course of our practical and experimental work in connection with hydrodynamic power transmission devices of the type concerned we have succeeded in structurally combining and uniting both self-locking devices L, L2 described above with reference to Figs. 1, 1a, 1b into one unitary coupling structure of relatively small size, which acts automatically in response to variations of the load and fulfills all the duties of said self locking devices L, L2, without showing the drawbacks inherent to the latter.

In the embodiment of the invention shown in Figs. 2-6 the said unitary coupling structure comprises a double acting clutch attached to the said intermediate shaft and a braking mechanism co-operatively connected with the said clutch, the stationary casing and the secondary shaft.

The double-acting clutch essentially consists of:

a. Screw threads 35 preferably of square cross sectional shape, which are exteriorly provided on a portion of the intermediate shaft 30, b. A primary coupling member, namely a nut 45 geared on said threaded portion 35, so as to be capable of travelling to and fro thereon, and being provided with two sets of axially directed teeth 41, 42 on the opposite faces thereof like a crown wheel, c. Two secondary coupling members designed for cooperation with the said primary coupling member and comprising a set of teeth 51 arranged at the stationary casing C in opposed position to the teeth 41 of the primary coupling member and another set of teeth 52 arranged at an auxiliary coupling member 22 keyed at 23 to the secondary shaft 20, d. Two stops 36, 37 in the form of rings secured to the intermediate shaft for limiting the motion of the primary coupling member 45 in both directions; the position of said stops is so chosen with regard to the depth of the teeth 41, 42, that the outer surfaces of the latter will not come into contact with the opposed faces b, b' (Fig. 6) of the stationary casing and the said auxiliary coupling member respectively, when the clutch is in operation.

In the embodiment of the invention shown in Figs. 2-6, the braking mechanism which cooperates with the double acting coupling member 41, 42, 45 is designed on the order of a double acting friction clutch; the latter comprises:

a. A primary friction member in the form of a ring shaped brake shoe, circumferentially enclosing coupling member 45 and being preferably made in two semicircular pieces 65, 65', which are moveably attached to the coupling member 45 by means of studs 66, 66' and are spaced from each other and from the coupling member 45 by means of springs 67. The said brake shoe may be conveniently provided with an exchangeable lining 68. We prefer to make said brake shoe of a material which combines high mechanical strength and light weight, for instance aluminium alloys—such as "Aluminium AW 15", "Pantal", "Silumin"—in order to reduce to a minimum the centrifugal forces which are imparted to said brake shoe in rotating, and which vary within large limits; the work of the braking mechanism is thus rendered more uniform;

b. Two secondary friction members namely shells having cylindrical inner working faces 75, 85 with which the stationary casing C and the auxiliary coupling member 22 are formed.

The operation of the double acting clutch and braking mechanism described with reference to Figs. 2-6 is as follows:

As long as the intermediate shaft 30, keyed to the guide wheel G, and the nut 45 attached thereon rotate in forward direction, that is jointly with the secondary (turbine) shaft—but at a slower rotary speed ranging between zero and that of the secondary shaft—the oppositely acting frictional forces or torques imparted to the brake shoes 65, 65' by the stationary shell C—75 and the rotary shell 85—22, 20 respectively will be in practice in equilibrium, which means that nut 45 remains in its neutral position shown in Fig. 3.

Whenever the secondary shaft 20 loses speed in response to an increase of the load and the backwardly directed torque imparted by the stationary shell C—75 to the brake shoes 65, 65' exceeds the forwardly acting torque originating from the rotary shell 22, the nut 45 will move to the left—toward the stationary shell C—75 with the result, that their teeth 41—51 come into engagement (Fig. 4), thus arresting intermediate shaft 30 and guide wheel G, and that the device thereupon acts as a torque converter.

Reversely—whenever the secondary shaft 20 regains speed in response to a decrease of the load and in turn the guide wheel G and the intermediary shaft 30, having re-commenced revolving in forward direction, have regained a rotary speed exceeding that of the secondary shaft 20, the nut 45 will be moved to the right into engagement with the teeth 52 of the rotary shell 22; in this latter case the device acts as a hydrodynamic coupling—the torque of the guide wheel G being added to that of the secondary (or turbine) shaft 20.

In order to ensure the unobstructed interengagement of the aforesaid teeth 41, 42 and 51, 52, respectively, when the coupling member 45 is thrown into operation (see arrow i) the outer faces t, t' of said teeth should be arranged at an angle to their bases b, b', namely sloping in the relative direction of rotation indicated by arrows a, a' of the respective members, to which said teeth are attached—as diagrammatically shown in Fig. 6.

In the embodiment of the invention shown by way of another example in Figs. 7 and 8 the braking mechanism cooperatively associated with the primary coupling member is of structurally modified design; the said braking mechanism comprises:

a. Two primary friction members in the form of rings 46, 46' secured to bolts 47, 47', which are resiliently and adjustably mounted by means of springs 48, 48', and nuts 49 in a flange 45i projecting from the primary coupling member 45a.

b. Two secondary friction members namely flanges 76, 77 provided at the stationary casing and an auxiliary coupling member 22a respectively which is keyed to the secondary shaft; the inner working faces of said flanges are preferably covered with exchangeable linings 76', 77'.

The cooperation of the braking mechanism shown in Figs. 7-8 with the stationary flange 76', 76, C and the rotary flange 77', 77, 22a and its reaction upon the primary coupling member 45a is substantially the same as described with reference to the braking mechanism shown in Figs. 2-6.

As indicated in Fig. 8 the bolts 47, 47' should be so adjusted, that whenever one of the rings 46 or 46' comes into frictional engagement with the corresponding flange 76 or 77, the other ring is out of engagement.

Various other changes and modifications may be conveniently made in the structural details of automatic coupling structures for hydrodynamic power transmission devices of the improved design described above, without departing from the spirit and the leading ideas of this invention.

For instance the primary and secondary friction members shown and described with reference to Figs. 7 and 8 may be differently arranged:

In the structurally modified embodiment of the invention shown in Fig. 9 the primary coupling member 45b is formed with an annular brake shoe 5 having working faces in the form of conically shaped grooves at opposite sides thereof, which present the primary friction members of the brake, while the two secondary friction members are in the form of rings 6, 6' having bevelled edges and being adjustably and resiliently mounted by means of bolts, springs and nuts in flanges 76b, 77b of the stationary casing and an auxiliary coupling member 22b keyed to the secondary shaft 20.

What we claim is:—

1. In a hydrodynamic power transmission device of the Föttinger type, the combination with a stationary casing, of bladed wheels enclosing a single fluid circuit and including a pump wheel, a turbine wheel of the centripetal type and a guide wheel, rotary shafts, including a driving shaft fixed to said pump wheel, a driven shaft keyed to said turbine wheel, and an intermediate shaft keyed to the said guide wheel, the latter being so designed and cooperatively associated with the other wheels, the stationary casing and the driven shaft as to be capable of alternately acting as a stationary guide member for torque conversion or as a turbine for assisting the work of the driven shaft, and locking means, including a double acting clutch and a selfacting braking mechanism, which cooperatively associate the latter, the stationary casing and the driven shaft so as to automatically interlock in response to variations of the load the intermediate shaft either with the stationary casing or with the driven shaft.

2. Hydrodynamic power transmission device having the features set forth in claim 1, in which said double acting clutch comprises screw threads exteriorly attached on a portion of said intermediate shaft, a primary coupling member in the form of a nut geared on said screw threads and having two sets of teeth axially projecting therefrom, stops for limiting the travel of said primary coupling member, two secondary coupling members designed for cooperation with said primary coupling members and comprising an auxiliary coupling member keyed to the secondary shaft, and two sets of teeth arranged in opposed position to those of the primary coupling member at the stationary casing and the said auxiliary coupling member respectively.

3. Hydrodynamic power transmission device having the features set forth in claim 1, in which the said braking mechanism comprises a cylindrical shell formed at the said stationary casing, and an auxiliary coupling member keyed to the secondary shaft, and being formed with a cylindrical shell, and a brake shoe mounted on said clutch for cooperation with said shells.

4. Hydrodynamic power transmission device having the features set forth in claim 1, in which the said braking mechanism comprises a cylindrical shell formed at the said stationary casing, and an auxiliary coupling member keyed to the secondary shaft, and being formed with a cylindrical shell and a brake shoe mounted on said clutch for cooperation with said shells, said brake shoe being composed of a plurality of sections spaced from each other, springs being provided for resiliently pressing the latter against the said cylindrical shells.

5. Hydrodynamic power transmission device having the features set forth in claim 1, in which said double acting clutch comprises screw threads exteriorly attached on a portion of said intermediate shaft, a primary coupling member in the form of a nut geared on said screw threads and having two sets of teeth axially projecting therefrom, stops for limiting the travel of said primary coupling member, two secondary coupling members designed for cooperation with said primary coupling members and comprising an auxiliary coupling member keyed to the secondary shaft, and two sets of teeth arranged in opposed position to those of the primary coupling member at the stationary casing and the said auxiliary coupling member respectively, the faces of those teeth, which are opposed to each other, being arranged at an angle to their base.

6. Hydrodynamic power transmission device having the features set forth in claim 1, in which said braking mechanism comprises an auxiliary coupling member keyed to the secondary shaft and being provided with a ring shaped flange, another ring shaped flange formed at the stationary casing, and two ring-shaped brake elements adjustably and resiliently attached to said clutch at opposite sides of the latter for cooperation with said flanges.

7. Hydrodynamic power transmission device having the features set forth in claim 1, in which said braking mechanism comprises an auxiliary coupling member keyed to the secondary shaft and having resiliently attached a ring shaped braking element another ring shaped braking element formed at the stationary casing, and a brake shoe circumferentially projecting from said clutch and having two axially directed working faces at opposite sides for cooperation with said braking elements.

EGON MARTYRER.
RUDOLF HAECKEL.